(12) United States Patent
Dreano

(10) Patent No.: US 6,743,008 B2
(45) Date of Patent: Jun. 1, 2004

(54) SET OF BAKING MOULDS FOR FOOD PRODUCTS

(75) Inventor: Claude Dreano, Mauron (FR)

(73) Assignee: Armor Inox, Mauron (FR)

(*) Notice: Subject to any disclaimer, the term of this patent is extended or adjusted under 35 U.S.C. 154(b) by 194 days.

(21) Appl. No.: 09/984,804

(22) Filed: Oct. 31, 2001

(65) Prior Publication Data

US 2002/0050554 A1 May 2, 2002

(30) Foreign Application Priority Data

Oct. 31, 2000 (FR) .............................. 00 14011

(51) Int. Cl.$^7$ .............................. A22C 7/00; B30B 7/00
(52) U.S. Cl. ...................... 425/233; 425/338; 249/126; 249/159; 99/349
(58) Field of Search .................. 425/340, 233, 425/338, 235, 339; 249/126, 159; 426/512, 517; 99/349

(56) References Cited

U.S. PATENT DOCUMENTS

| | | | | |
|---|---|---|---|---|
| 275,216 A | * | 4/1883 | Hyatt | .......................... 249/126 |
| 3,580,165 A | * | 5/1971 | Foldenauer | .................... 99/351 |
| 4,556,191 A | * | 12/1985 | Mangogna | ................... 249/126 |
| 5,992,304 A | * | 11/1999 | Champalaune et al. | ........ 99/349 |
| 6,596,330 B1 | * | 7/2003 | Roser Laromaine | ......... 426/513 |

FOREIGN PATENT DOCUMENTS

| | | |
|---|---|---|
| DE | 33 15311 A1 | 12/1983 |
| FR | 248 5884 | 1/1982 |
| FR | 2688 385 A1 | 9/1993 |
| FR | 2731 894 A1 | 9/1996 |
| FR | 2754 677 A1 | 4/1998 |
| FR | 2788 668 A1 | 7/2000 |
| WO | WO 97/34494 | 9/1997 |

OTHER PUBLICATIONS

French Preliminary Search Report, Jul. 4, 2001.

* cited by examiner

Primary Examiner—Robert Davis
Assistant Examiner—Thu Khanh T. Nguyen
(74) Attorney, Agent, or Firm—Blank Rome LLP

(57) ABSTRACT

The invention relates to a set of baking moulds for food products such as hams, including a plurality of moulds mounted on a support frame (5, 6), each mould comprising a trough (2) with a generally U-shaped transverse section in order to form a bottom (13) and two side walls (4).

The top edges of the side walls (4) form folded flaps (7), the adjacent flaps of the two troughs (2) being connected together.

20 Claims, 1 Drawing Sheet

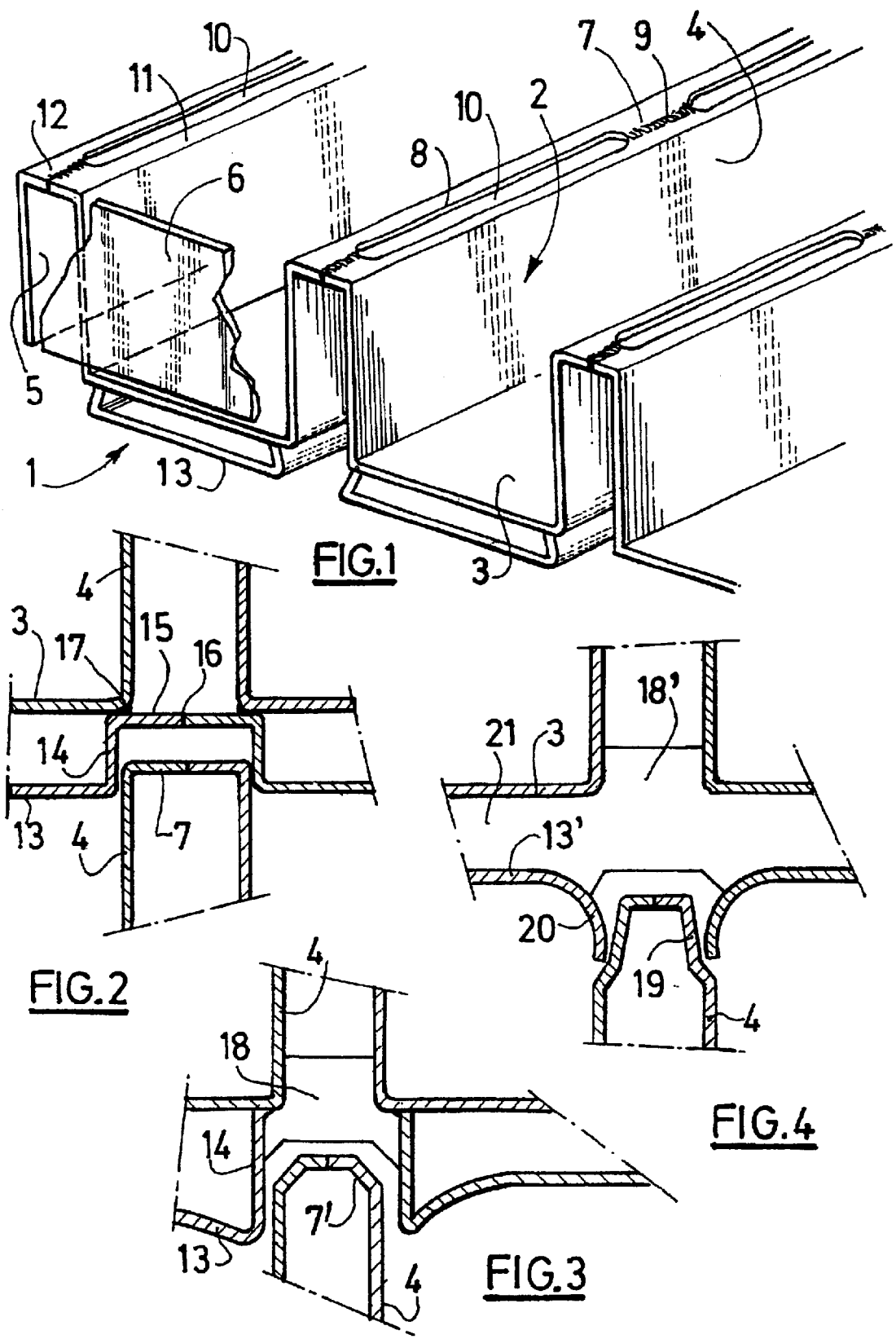

SET OF BAKING MOULDS FOR FOOD PRODUCTS

The present invention relates to a set of baking moulds for food products such as hams, and more particularly such a set including a plurality of moulds mounted on a support frame, each mould comprising a trough with a substantially U-shaped transverse section in order to form a bottom and two side walls.

Such sets are known for example through the document FR-A-2.485.884.

Such sets generally give satisfaction. However, industrial butchers specialising in ham in pre-cut log form find variations in cross-section over the length of the log. For logs of great length, greater than one meter, this defect is accentuated. This defect is related to a deformation of the troughs, whose rigidity is insufficient when the length is great.

The present invention aims to mitigate these drawbacks.

More particularly, the aim of the invention is to provide sets of moulds of the type described above where the troughs have sufficient rigidity to avoid variations in cross-section of the log of ham after it is baked.

For this purpose, the object of the invention is a set of baking moulds for food products such as hams, comprising a plurality of moulds mounted in a support frame, each mould comprising a trough with a generally U-shaped transverse section in order to form a bottom and two side walls, characterised by the fact that the top edges of the side walls form folded flaps, the adjacent flaps on two troughs being connected together.

In this way the rigidity of the troughs is considerably increased, which avoids any variation in their cross-section when they are under load.

In a particular embodiment, the flaps adjacent to the frame are connected to the said frame.

Also in a particular embodiment, the said flaps are folded substantially parallel to the said frames.

The external edges of the said flaps can be cut so as to delimit scallops for the passage of heat.

These scallops leave a clear passage necessary for the circulation of heat-transfer or refrigerating fluids.

The set of moulds can also include, at the bottom part, covers intended to press the products contained in another set situated under the said set. In this case, the adjacent edges of two covers can be connected together.

The connections between the flaps and/or between flaps and frame can notably be effected by welding the external edges of the said flaps.

It is also possible to provide struts connecting the bottom parts of the troughs.

The said covers can be fixed to the said troughs by means of the said struts.

A description will now be given by way of non-limitative example of particular embodiments of the invention with reference to the accompanying schematic drawings, in which:

FIG. 1 is a partial perspective view of a set of moulds according to the present invention; and FIGS. 2 to 4 are views in partial transverse section of sets placed above each other according to three different embodiments.

There can be seen in FIG. 1 a set 1 of moulds formed by troughs 2 with a U-shaped transverse section forming a bottom 3 and side walls 4.

The troughs are fixed to a rectangular frame formed by two L-shaped angle irons 5 parallel to the troughs 2, and two end walls 6 closing the troughs at their ends.

Feet (not shown) are welded to the angle irons 5 to enable a plurality of sets 1 to be stacked.

The troughs 1 are fixed to the frame firstly in a known manner by means of studs (not shown) forming a projection at the outside of the side walls 4 in order to enter corresponding holes in the end plates 6.

In addition, the top edges of the side walls 4 of the troughs 2 are folded substantially perpendicularly to these walls in a plane generally perpendicular to the plane defined by the frame, in order to form flaps 7. These flaps form scallops 8.

The flaps 7 are connected between the scallops 8 by welds 9 produced along their edge. In this way thermal passages 10 are delimited, allowing the circulation of heat-transfer or refrigerating fluids.

In addition, the external flap 11 of each side trough is welded in the same way to edge of the top wing 12 of the adjacent angle iron 5. This angle iron is itself scalloped so as to leave thermal passages 10 as before.

FIG. 1 also shows covers 13 welded under the bottom 3 of each trough 2. These covers consist here of a metal sheet generally folded in a U shape, where the edges of the wings are welded to the bottom 3.

When two sets like the set 1 are placed one above the other, the covers 13 of the top set enter the troughs 2 of the bottom set so as to ensure the pressing of the products contained in these troughs.

In FIG. 2 a variant embodiment can be seen in which the wings 14 on the covers 13 have their top edges 15 themselves folded perpendicularly as is the case with the edges 7 of the side walls 14 of the troughs. Heat-passage scallops are also formed.

The edges of the adjacent flaps 15 are welded at 16, which also contributes to the rigidity of the moulds.

The assembly consisting of the covers 13 is itself welded at 17 to the assembly consisting of the troughs.

In the embodiment in FIG. 3, the flaps 7' formed at the top part of the side walls 4 of the troughs are folded twice at 45°. In addition, the rigidity of the bottom part of the sets 1 is here provided by struts 18 substantially perpendicular to the longitudinal direction of the troughs, welded both between the side walls 4 of the troughs and between the wings 14 of the covers.

In the embodiment in FIG. 4, the top parts of the side walls 4 of the troughs form a "rim" 19 in which the downward curved edges 20 of the covers 13' engage. In addition, in this embodiment, the struts 18' are extended in a continuous fashion 21 under the bottom 3 of the troughs. Covers 20 are welded under these struts 18, which thus provide the connection between the troughs and the covers.

What is claimed is:

1. A set of baking moulds for food products including a plurality of moulds mounted on a support frame (5, 6), each mould comprising a through (2) with a generally U-shaped transverse section in order to form a bottom (3) and two side walls (4), wherein the top edges of the side walls (4) form folded flaps (7, 7') having external edges which are cut so as to delimit scallops (8) for a heat passage (10), the adjacent flaps of the two troughs (2) being connected together.

2. A set according to claim 1, in which the flaps adjacent to the frame are connected to the frame.

3. A set according to claim 1, in which the said flaps (7, 7') are folded substantially parallel to the said frame.

4. A set according to claim 1, further comprising a cover (13, 13') under the bottom (3), the cover being intended to press the products contained in another set situated under the said set, and in which the adjacent edges of the two covers are connected together.

5. A set according to claim 1, in which the connections between flaps (7, 7') and/or between the flap (7') and the frame (5) are effected by welding the external edges of the said flaps.

6. A set according to claim 1, further comprising struts (18, 18') connecting the bottom parts of the adjacent troughs.

7. A set according to claim 4, in which the said covers (13') are fixed to the said troughs by means of struts (18').

8. A set of baking moulds for food products including a plurality of moulds mounted on a support frame (5, 6), each mould comprising a through (2) with a generally U-shaped transverse section in order to form a bottom (3) and two side walls (4), wherein the top edges of the side walls (4) form folded flaps (7, 7'), the adjacent flaps of the two troughs (2) being connected together, and struts (18, 18') connecting the bottom parts of the adjacent troughs.

9. A set according to claim 8, in which the flaps adjacent to the frame are connected to the frame.

10. A set according to claim 8, in which the flaps (7, 7') are folded substantially parallel to the frame.

11. A set according to claim 8, in which the external edges of the said flaps (7; 7') are cut so as to delimit scallops (8) for a heat passage (10).

12. A set according to claim 8, further comprising a cover (13, 13') under the bottom (3), the cover being intended to press the products contained in another set situated under said set, and in which the adjacent edges of the two covers are connected together.

13. A set according to claim 8, which connections between flaps (7, 7') and/or between the flap (7') and the frame (5) are effected by welding the external edges of the flaps.

14. A set according to claim 12, in which the covers (13') are fixed to the troughs by means of the struts (18, 18').

15. A set of baking moulds for food products including a plurality of moulds mounted on a support frame (5, 6), each mould comprising a through (2) with a generally U-shaped transverse section in order to form a bottom (3) and two side walls (4), wherein the top edges of the side walls (4) form folded flaps (7, 7'), the adjacent flaps of the two troughs (2) being connected together, and a cover (13; 13') under the bottom (3), the cover being intended to press the products contained in another set situated under said set, and in which the adjacent edges of the two covers are connected together, said covers (13, 13') being fixed to the said trough by struts (18, 18').

16. A set according to claim 15, in which the flaps adjacent to the frame are connected to the frame.

17. A set according to claim 15, in which the flaps (7, 7') are folded substantially parallel to the frame.

18. A set according to claim 15, in which the external edges of the said flaps (7; 7') are cut so as to delimit scallops (8) for a heat passage (10).

19. A set according to claim 15, further comprising struts (18, 18') connecting the bottom parts of the adjacent troughs.

20. A set according to claim 15, in which connections between flaps (7, 7') and/or between the flap (7') and the frame (5) are effected by welding the external edges of the said flaps.

* * * * *